United States Patent [19]

Mayhew et al.

[11] Patent Number: 4,540,755

[45] Date of Patent: Sep. 10, 1985

[54] INCLUSION OF OXYGEN IN THE POLYMERIZATION OF OLEFINS

[75] Inventors: Harry W. Mayhew, Cincinnati; Richard J. French, Loveland; Louis J. Rekers, Wyoming, all of Ohio

[73] Assignee: National Petro Chemicals Corporation, New York, N.Y.

[21] Appl. No.: 429,733

[22] Filed: Sep. 30, 1982

[51] Int. Cl.$^3$ ................................................ C08F 4/78
[52] U.S. Cl. .................................... 526/100; 526/129; 526/130; 526/134; 526/161; 526/172
[58] Field of Search ............... 526/100, 129, 130, 134, 526/161, 172

[56] References Cited

U.S. PATENT DOCUMENTS

| 2,153,553 | 4/1939 | Fawcett et al. | 526/352.2 |
|---|---|---|---|
| 2,868,772 | 1/1959 | Ray et al. | 526/138 |
| 2,945,015 | 7/1960 | Detter | 526/106 |
| 2,994,691 | 8/1961 | Gates | 526/138 |
| 3,346,511 | 10/1967 | Hill | 526/106 |
| 3,349,067 | 10/1967 | Hill | 526/100 |
| 3,365,439 | 1/1968 | Bjornson | 526/100 |
| 3,541,072 | 11/1970 | Witt et al. | 526/106 |
| 3,870,693 | 3/1975 | Wisseroth | 526/106 |
| 3,985,676 | 10/1976 | Rekers et al. | 526/100 |
| 4,192,775 | 3/1980 | Rekers et al. | 526/100 |

FOREIGN PATENT DOCUMENTS 471590  2/1937  United Kingdom .

Primary Examiner—Paul R. Michl
Assistant Examiner—Alex H. Walker
Attorney, Agent, or Firm—Kenneth D. Tremain

[57] ABSTRACT

Process for the polymerization of olefins comprising contacting an olefin, admixed with an oxygen-containing gas, with a supported organophosphoryl-chromium oxide catalyst.

33 Claims, No Drawings

INCLUSION OF OXYGEN IN THE POLYMERIZATION OF OLEFINS

BACKGROUND OF THE INVENTION

The present invention relates to a process for improving the polymerization of olefins and more particularly to the utilization of an oxygen-containing gas in an olefin polymerization process which employs a supported organophosphoryl-chromium oxide catalyst system.

Numerous processes are known for the polymerization of olefins utilizing chromium oxide supported catalysts. For example, U.S. Pat. Nos. 3,985,676 and 4,192,775 disclose excellent supported catalysts systems prepared by depositing preformed materials comprising the reaction product of organophosphorus compounds, such as organophosphates and organophosphites, with chromium trioxide. Such catalysts provide excellent resin products, particularly polyethylenes having very desirable physical properties.

Notwithstanding, the excellence of these catalysts systems, some difficulty has been observed occasionally in the producing resin of a desired density.

The literature, including the patent literature, is replete with methods for improving olefin polymerization process. For example, numerous U.S. patents including U.S. Pat. Nos. 2,994,691, 2,868,772 and British Pat. No. 471,590 add oxygen to the polymerization medium for various reasons. In particular, U.S. Pat. No. 2,994,691 discloses the use of oxygen or an oxygen-containing gas such as air in contact with the reaction medium of a catalyst system comprised of a transition metal halide such as titanium tetrachloride and an organometallic, such as a trialkylaluminum, and an alpha-olefin to increase the speed of polymerization and the yield of polymer produced per unit of catalyst. Similarly, U.S. Pat. No. 2,868,772 discloses the addition of an oxygen containing component such as molecular oxygen or hydrogen peroxide, to catalyst systems comprised of transition metal halides and organometallics useful in the production of alpha-olefin polymers having relatively uniform molecular weights. British Pat. No. 471,590 illustrates an early recognition of the role of oxygen in high pressure olefin polymerization processes.

Moreover, the use of oxygen or air in the activation of supported chromium oxide catalysts is also well known as evidenced for example by U.S. Pat. Nos. 3,985,676, 4,192,775, 3,349,067, 3,541,072, 3,870,693, 3,346,511, 2,945,015 and 3,365,439.

SUMMARY OF THE INVENTION

Accordingly, it is one object of the present invention to provide an improved process for the polymerization of alpha-olefins.

Another object of this invention is to provide a process for the polymerization of alpha-olefins which produces resins having improved physical properties.

Still another object of the present invention is to provide an improved polymerization process utilizing a supported organophosphoryl-chromium catalyst.

A still further object of this invention is to provide a polymerization process which provides polyolefins having improved resin densities and other physical properties including improved stress crack resistance in products produced therefrom.

These and other objects are accomplished herein by providing an olefin polymerization process comprising contacting an alpha-olefin, in the presence of an oxygen containing gas, with a catalyst system prepared by depositing on a solid inorganic support material the reaction product of chromium trioxide and an organophosphorus compound having the formula:

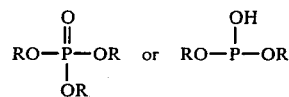

wherein R is alkyl, aralkyl, aryl, cycloalkyl, or hydrogen, with the proviso that at least one R group is other than hydrogen. For example, the oxygen containing gas may be added in amounts of from about 0.1 to about 10 ppm based on total feed to the reactor.

DETAILED DESCRIPTION OF THE INVENTION

In accordance with the present invention, it has been surprisingly discovered that the deliberate controlled addition of molecular oxygen or other oxygen containing gas, such as air, into the polymerization reaction media of alpha-olefins in contact with certain organophosphoryl-chromium product supported catalysts results in improved physical properties of the resulting resins.

More particularly, supported catalysts compositions used in the process of the present invention are those disclosed, for example, in U.S. Pat. No. 3,985,676 the entire disclosure of which is incorporated herein by reference. Generally, these catalysts are prepared by depositing the reaction product of chromium trioxide with an organophosphorus compound having the formula:

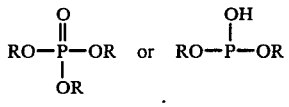

wherein R is alkyl, aralkyl, aryl, cycloalkyl, or hydrogen with the proviso that at least one R group is other than hydrogen, on an organic support material. In a typical preparation of the catalysts contemplated in the present process, the organophosphorus compound and the chromium trioxide are brought together in a suitable inert solvent, e.g., cyclohexane, n-hexane, methylene chloride, carbon tetrachloride, etc. In this step in the preparation of the catalyst system, the solid $CrO_3$ is slurried in the solvent and the organophosphorus compound added. Over a period of time, e.g., about one hour, a reaction between the compounds ensues and the chromium trioxide disappears. During this period the solution becomes reddish-brown in color. It is ordinarily filtered simply to insure the absence of any unreacted solid $CrO_3$. This solution is then applied to the support in such manner as to effect the deposition of the catalyst solution thereon, suitably by any wet coating technique, e.g., spraying, on a support, e.g., silica, alumina, etc. Typically, the solution is added to a dispersion of the preferred silica gel support. The preferred support is a high pore volume (>1.96 cc/g) silica xerogel. The solvent is removed from the base by drying, e.g., using heat, inert gas stripping, or reduced pressure alone or in combination. In this manner, the reaction product is placed on the support. It is considered significant that the organophosphoryl chromium reaction product is preformed i.e. the reacting entities are combined prior to the introduction to the support. The active catalyst is therefore understood not to derive from chromium trioxide but the organophosphoryl chromium reaction product as described.

The supported catalyst is then heated in a dry oxygen containing atmosphere, such as dry air, resulting in a marked promotion of polymerization activity. Heating is conducted at temperatures in the range of from about 400° to 2000° F., and preferably from about 1000° to 1790° F. The time period of the heating will vary depending on the temperature but usually is conducted for from about at least 2 to 18 and preferably from about 6 to 12 hours.

The supported reaction product, after heat treatment, is then used alone or in conjunction with known and conventional metallic and/or non-metallic reducing agents. Thus, for example, the following metallic reducing agents can be used herein: trialkyl aluminums such as triethyl aluminum, triisobutyl aluminum; alkyl aluminum halides; alkyl aluminum alkoxides; dialkyl zinc; dialkyl magnesium; metal borohydrides including those of the alkali metals, especially sodium lithium and potassium, and of magnesium, beryllium and aluminum. The non-metal reducing agents include alkyl boranes such as triethyl borane, triisobutyl borane, and trimethyl borane and hydrides of boron such as diborane, pentaborane, hexaborane and decaborane. The foregoing metallic and non-metallic compounds can be combined with supported catalysts herein prior to being fed to an olefin polymerization reactor or these two components can be fed separately to the olefin polymerization reactor.

In proportioning the amount of metallic or non-metallic compound to the amount of titanium-phosphorous-chromium compound used in the catalyst system of the present invention, fairly wide latitude is available, but some guidelines have been established consistent with good yield, favorable polymer properties and economic use of materials. For example, in the use of metallic and/or non-metallic reducing agents with an amount of the herein chromium compound sufficient to yield about 1% chromium by weight of the support, the parameters set forth below are representative. The atomic ratios are based upon a calculation of the metal in the metallic reducing agent and/or the non-metal in the non-metallic reducing agent versus the chromium content present in the compound on the support.

For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to about 8/1, or from about 1.9% to about 30% by weight TIBAL. The overall practicable limits of TIBAL in terms of the Al/Cr atomic ratios are from about 0.1/1 to 20/1, and in terms of weight are from about 0.4% to about 75% by weight.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl borane(TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1 to 10/1, or from about 0.19 to about 19% TEB. The overall practicable limits, in terms of a B/Cr ratio, are from about 0.01/1 to about 20/1, and in terms of weight, are from about 0.02% to about 38% by weight based upon the weight of the support.

As indicated above, the catalyst compositions of this invention are amenable to use with conventional polymerization processes for olefins, in particular alpha-olefins having 2 to 10 carbon atoms and are suitable for polymerization effected under temperature and pressure conditions generally employed in the art, e.g., temperatures of from about 40° to about 200° C. and preferably from about 70° to 110° C., and pressures of from 200 to 1000 psig and preferably from 300 to 800 psig, as are used in slurry or particle form polymerizations.

The inorganic support materials which are useful in the present process include those normally employed in supported chromium catalysts and in olefin polymerizations. Typically, these support materials are inorganic oxides of silica, alumina, silica-alumina mixtures, thoria, zirconia and comparable oxides which are porous and have a medium surface area. As indicated above, especially preferred are the silica xerogels disclosed and claimed in U.S. Pat. Nos. 3,652,214, 3,652,215 and 3,652,216 which are incorporated by reference herein. These silica xerogels have a surface area in the range of 200 to 500 m$^2$/g, a pore volume greater than about 2.0 cc/g, a major portion of the pore volume being provided by pores having diameters in the range of 300 to 600 Å.

In carrying out the polymerization process of the present invention, the resin density as well as increased environmental stress crack resistance (ESCR) of products prepared from the resin are realized by the presence of oxygen in the reaction medium. Thus, the oxygen may be introduced to the reaction medium by mixing with the olefin feed or by separate feed of oxygen into the catalyst composition. The oxygen employed in the present process may be in the form of molecular oxygen or an oxygen containing gas such as air, and the like. The concentration of oxygen necessary to provide the desired results in the practice of the present process is from about 0.03 ppm to about 2.5 ppm by volume based on diluent plus unreacted olefin, such as ethylene. Preferably, the oxygen is introduced into the polymerization system in amounts ranging from about 1 ppm to about 2 ppm based on diluent plus unreacted olefin, such as ethylene.

The polymerization reaction conditions employed in the present process are those conventionally used, e.g. temperature of from about 40° C. to about 200° C. and preferably from about 70° C. to 110° C. and pressures of from 200 to 1000 psig and preferably from 300 to 800 psig as are used in slurry or particle form polymerization. Olefins which are polymerized in accordance with the present process are typically alpha-olefins having from 2 to 10 carbon atoms. Especially good results are achieved with ethylene.

A typical bench scale polymerization according to the present invention would be carried out in the following manner: The supported chromium trioxide catalyst and aluminum compound where used, and the reducing agent where used, is added along with the isobutane solvent to a stirred one gallon autoclave. The contents of the stirred autoclave are then heated to the polymerization temperature, i.e., 88° to 108° C. Hydrogen is added and then ethylene mixed with oxygen gas at for example 1–2 ppm is added to give 10 mole % ethylene in the liquid phase at which time the total pressure will be from about 42 to 450 psig. Polymerization begins almost immediately as noted by the ethylene coming from the ethylene demand supply system to the reactor. After approximately one hour of polymerization, the reaction is terminated by dropping the reactor contents into a pressure let-down system.

The catalysts of the present invention used in the polymerization processes herein are typically prepared.

CATALYST PREPARATION PROCEDURE

A. Microspheroidal silica gel having a pore volume of about 2.5 cc/g prepared in accordance with the disclosure in U.S. Pat. No. 3,652,215 is added to a 2000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. A dichloromethane solution of the reaction product of $CrO_3$ and triethyl phosphate prepared as described in U.S. Pat. No. 3,985,676 is then added to the flask in sufficient quantity to provide a dry coated catalyst containing about 1% by weight of Cr. The supernatant liquid is removed by filtration and the coated gel is dried in a rotary evaporator at 60° C. and with 29 inches of Hg vacuum.

B. Dichloromethane is added to a similar flask as used in step A and while maintaining a nitrogen atmosphere stirring is commenced. To the flask is added the supported chromium composition prepared in step A above. A solution of dichloromethane and aluminum sec-butoxide is prepared in a pressure equalizing dropping funnel and the funnel attached to the stirred flask. The aluminum sec-butoxide solution is gradually added to the flask at the rate of 10 grams of solution per minute. After the addition of the solution is complete, the slurry in the flask is stirred for about 1 hour. The supernatant liquid is removed by filtration and the coated gel is dried in a rotary evaporator at temperatures up to about 60° C. and 29 inches Hg vacuum. The amount of aluminum compound added depends on the % aluminum desired for the production of olefin polymers having specific properties necessary for certain end use applications.

C. To heat activate the catalyst composition prepared in step B, the supported catalyst is placed in a cylindrical container and fluidized with dry air at 0.20 feet per minute lineal velocity while being heated to a temperature of 900° C. and held at this temperature for 6 hours. The activated supported catalyst is recovered as a powder.

In Table 1 below, a series of polymerizations were carried out to illustrate the results obtained in the utilization of oxygen during the polymerization. The catalysts were prepared as in the Catalyst Preparation Procedure above. The polymerizations were carried out at 210° F. and 650 psi hydrogen and triethyl borane were added to the polymerization reactor as indicated in the table.

TABLE I

| Example | Catalyst | TEB as B (ppm) | % Al | B/Cr mole ratio | $H_2/C_2^=$ mole ratio | g/PE/g Catalyst/Hr | ppm $O_2$ |
| --- | --- | --- | --- | --- | --- | --- | --- |
| 1 | triethyl phosphoryl chromium on silica gel (p.v. 2.3 cc/g) | 1.06 | 3.7 | 3.8 | 0.29 | 4940 | 0 |
| 2 | triethyl phosphoryl chromium on silica gel (p.v. 2.3 cc/g) | 1.03 | 3.7 | 2.6 | 0.40 | 3560 | 1.1 |
| 3 | triethyl phosphoryl chromium on silica gel (p.v. 2.3 cc/g) | 0.98 | 3.7 | 1.8 | 0.25 | 2690 | 1.5 |
| 4 | triethyl phosphoryl chromium on silica gel (p.v. 2.3 cc/g) | 1.03 | 3.7 | 1.8 | 0.31 | 2580 | 2.0 |
| 5 | triethyl phosphoryl chromium on silica gel (p.v. 2.3 cc/g) | 1.24 | 3.7 | 2.0 | 0.28 | 2100 | 2.5 |

TABLE II

| | Polyethylene (PE) Properties | | | | |
| --- | --- | --- | --- | --- | --- |
| Example | MI | HLMI | HLMI/MI | Density | ESCR $F_{50}$ hrs*- 12 oz bottle |
| 1 | 0.23 | 30.9 | 134 | .9548 | 14.7** |
| 2 | 0.41 | 43.4 | 105 | .9581 | 24.1 |
| 3 | 0.39 | 39.5 | 101 | .9590 | 26.0 |
| 4 | 0.58 | 71.6 | 123 | .9590 | 30.8 |

TABLE II-continued

| | Polyethylene (PE) Properties | | | | |
|---|---|---|---|---|---|
| Example | MI | HLMI | HLMI/MI | Density | ESCR F$_{50}$ hrs*- 12 oz bottle |
| 5 | 0.53 | 65.2 | 123 | .9591 | 51.35 |

*ESCR F$_{50}$ hrs = time for 50% failure of 12 oz bottle 25% full with 10% Igepal in oven at 140° F. with 5 psig air
**all ESCR values corrected to 0.15 MI and 0.953 density The substitution of other alpha-olefins, such as propylene and butene, for ethylene, in the above polymerization reaction also provides desirable polymers.

Obviously, other modifications and variations of the present invention are possible in light of the above-teachings. It is therefore to be understood that changes may be made in the particular embodiments of this invention which are within the full intended scope of the invention as defined by the appended claims.

What is claimed is:

1. A process for the polymerization of olefins said process comprising contacting an olefin admixed with an oxygen-containing gas with a catalyst prepared by depositing on a solid inorganic support material the reaction product of chromium trioxide and an organophosphorus compound having the formula:

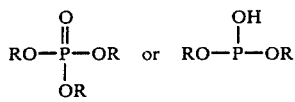

wherein R is alkyl, aralkyl, aryl, cycloalkyl, or hydrogen with the proviso that at least one R group is other than hydrogen and heat-activating the resultant catalyst and wherein the oxygen-containing gas is present in amounts of from about 0.1 to about 10 ppm based on total feed to the reactor.

2. The process of claim 1 wherein the olefin is an alpha-olefin.

3. The process of claim 1 wherein the olefin is ethylene.

4. A process according to claim 1 wherein an aluminum alkoxide is also deposited upon the inorganic support material prior to heat activation.

5. A process according to claim 1 wherein the inorganic support material is a silica xerogel having a surface area in the range of about 200 to about 500 m²/g, a pore volume greater than about 2.0 cc/g and a major portion of the pore volume being provided by pores having diameters in the range of 300 to 600 Å.

6. A process according to claim 4 wherein the aluminum alkoxide is aluminum sec-butoxide.

7. A process according to claim 4 wherein the heat-treated polymerization catalyst is combined with a metallic or non-metallic reducing agent, the metallic reducing agent being selected from the group consisting trialkyl aluminum, alkyl aluminum halides, alkyl aluminum alkoxides, dialkyl zinc, dialkyl magnesium, and the alkali metal and magnesium, beryllium and aluminum borohydrides, and the non-metallic reducing agent being selected from the group consisting of alkyl boranes and hydrides.

8. A process according to claim 1 wherein the oxygen containing gas is molecular oxygen.

9. A process according to claim 1 wherein the oxygen-containing gas is present in amounts of from about 0.3 to about 2.5 ppm by volume based on diluent plus unreacted olefin.

10. A process according to claim 1 wherein said organophosphorus compound is triethylphosphate.

11. A process according to claim 1 wherein the heat-treated polymerization catalyst is combined with a trialkyl borane.

12. A process according to claim 1 wherein the polymerization is carried out in the presence of hydrogen at an elevated temperature and pressure.

13. A process according to claim 1 wherein the process is carried out in a closed container.

14. A process as in claim 1 which is conducted at a pressure of up to about 1000 psig.

15. A process as in claim 13 which is conducted at a temperature of about 40° to 200° C.

16. A process as in claim 14 which is conducted under solution or slurry polymerization conditions.

17. A process as in claim 15 which is conducted in a closed container.

18. A process as in claim 14 wherein the olefin is an alpha olefin.

19. A process as in claim 17 wherein the olefin is ethylene.

20. A process as in claim 14 wherein an aluminum alkoxide is also deposited upon the inorganic support material prior to heat treatment and wherein the heat-treated Polymerization catalyst is combined with a metallic or non-metallic reducing agent, the metallic or non-metallic reducing agent being selected from the group consisting of trialkyl aluminum, alkyl aluminum halides, alkyl aluminum alkoxides, dialkyl zinc, dialkyl magnesium, and the alkali metal and magnesium, beryllium and aluminum borohydrides, and the non-metallic reducing agent being selected from the group consisting of alkyl boranes and hydrides.

21. A process for the polymerization of olefins said process comprising contacting an olefin admixed with an oxygen-containing gas with a catalyst prepared by depositing on a solid inorganic support material the reaction product of chromium trioxide and an organophosphorus compound having the formula:

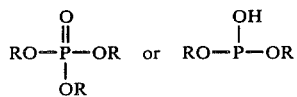

wherein R is alkyl, aralkyl, aryl, cycloalkyl, or hydrogen with the proviso that at least one R group is other than hydrogen and heat-activating the resultant catalyst and wherein the reaction is conducted at a pressure in the range of up to about 1000 psig.

22. The process of claim 21 wherein the olefin is an alpha-olefin.

23. The process of claim 21 wherein the olefin is ethylene.

24. A process according to claim 21 wherein an aluminum alkoxide is also deposited upon the inorganic support material prior to heat activation.

25. A process according to claim 21 wherein the inorganic support material is a silica xerogel having a surface area in the range of about 200 to about 500 m²/g, a pore volume greater than about 2.0 cc/g and a major portion of the pore volume being provided by pores having diameters in the range of 300 to 600 Å.

26. A process according to claim 24 wherein the aluminum alkoxide is aluminum sec-butoxide.

27. A process according to claim 24 wherein the heat-treated polymerization catalyst is combined with a metallic or non-metallic reducing agent, the metallic reducing agent being selected from the group consisting of trialkyl aluminum, alkyl aluminum halides, alkyl aluminum alkoxides, dialkyl zinc, dialkyl magnesium, and the alkali metal and magnesium, beryllium and aluminum borohydrides, and the non-metallic reducing agent being selected from the group consisting of alkyl boranes and hydrides.

28. A process according to claim 21 wherein the oxygen containing gas is molecular oxygen.

29. A process according to claim 21 wherein the oxygen-containing gas is present in amounts of from about 0.03 to about 2.5 ppm. by volume based on diluent plus unreacted olefin.

30. A process according to claim 21 wherein said organophosphorus compound is triethylphosphate.

31. A process according to claim 21 wherein the heat-treated polymerization catalyst is combined with a trialkyl borane.

32. A process according to claim 21 wherein the polymerization is carried out in the presence of hydrogen at an elevated temperature and pressure.

33. A process according to claim 21 wherein the process is carried out in a closed container.

* * * * *